Feb. 17, 1953
J. C. HALE
2,628,733
TOWING DOLLY
Filed Oct. 10, 1949
2 SHEETS—SHEET 1
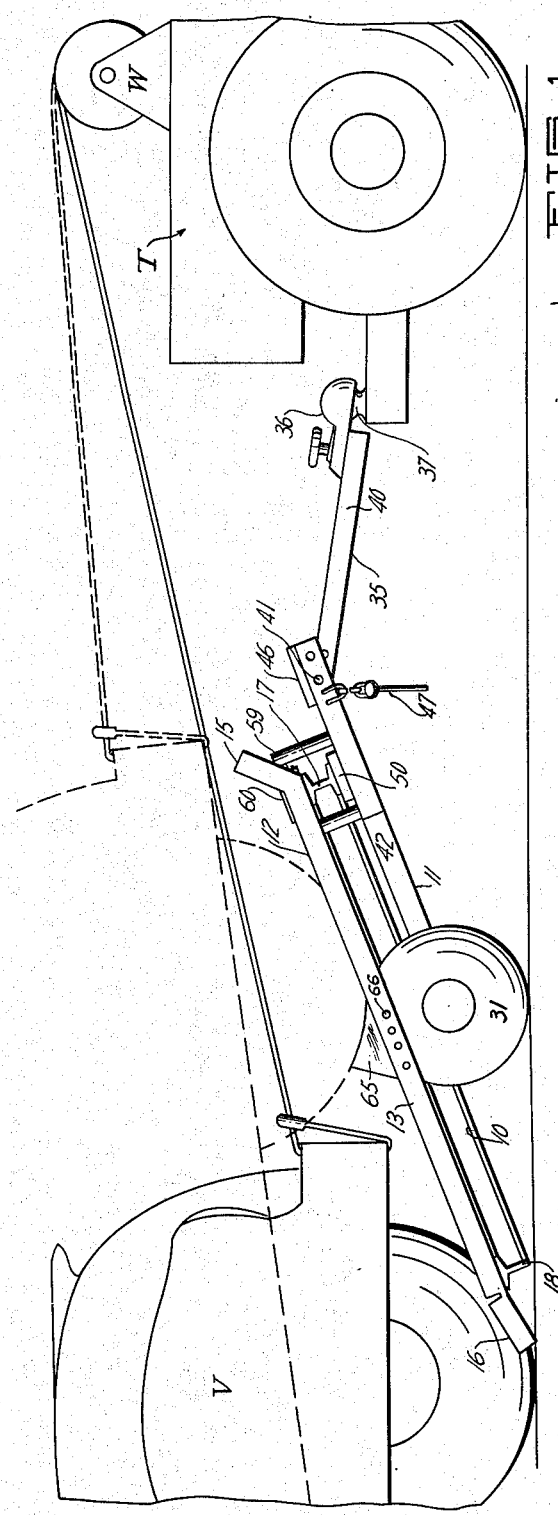
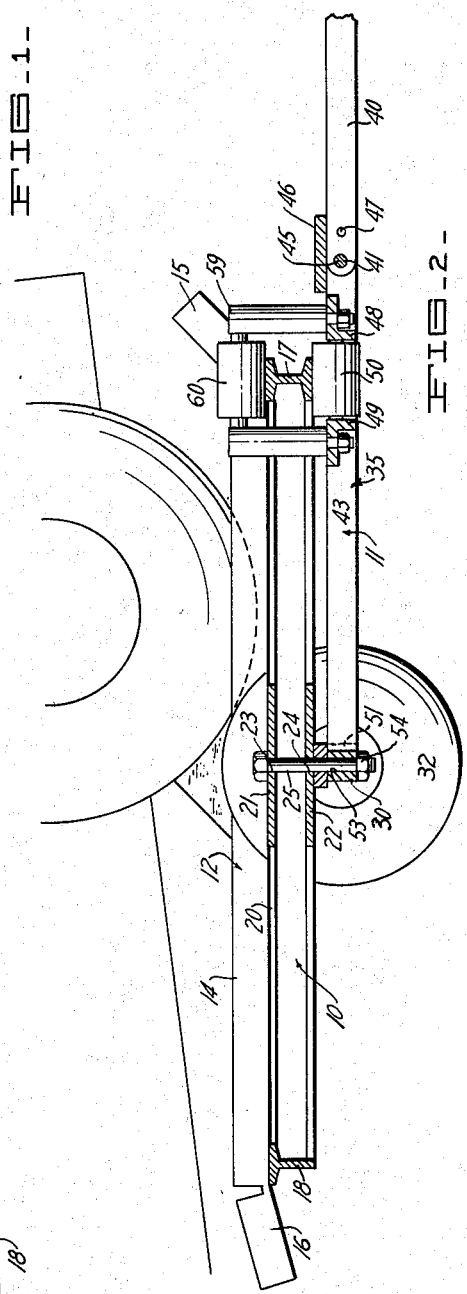
INVENTOR.
Jack C. Hale
BY Leslie M. Hansen
HIS ATTORNEY Feb. 17, 1953 — J. C. HALE — 2,628,733
TOWING DOLLY
Filed Oct. 10, 1949 — 2 SHEETS—SHEET 2
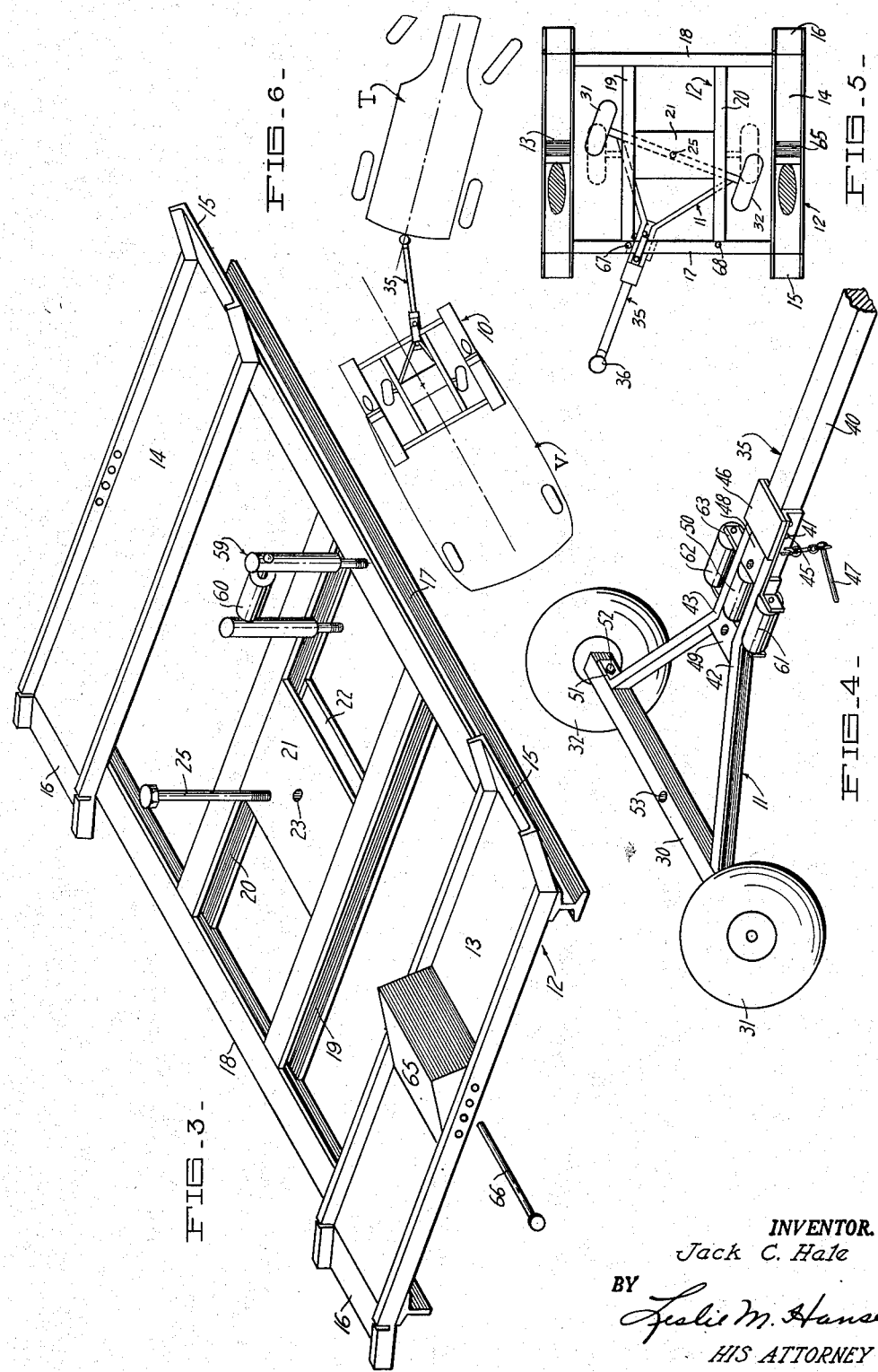
INVENTOR.
Jack C. Hale
BY Leslie M. Hansen
HIS ATTORNEY Patented Feb. 17, 1953

2,628,733

UNITED STATES PATENT OFFICE 2,628,733

TOWING DOLLY

Jack C. Hale, San Jose, Calif.

Application October 10, 1949, Serial No. 120,535

4 Claims. (Cl. 214—506)

This invention relates to a towing dolly and more particularly to a device for receiving either the fore or the aft wheels of a vehicle to be towed and for permitting turning of the towed vehicle relative to the dolly.

The present invention has as its principal object to provide a towing dolly for towing late model automobiles which are notoriously low slung. Such vehicles are difficult to raise by jackscrews and overhead winches due to the obstruction created by the skirting of the vehicle bodies and the present design of spring suspension of the vehicles.

It is an object of this invention to provide a dolly structure having a tiltable support for receiving either the front or the rear wheels of an automobile to be towed.

Another object is to provide a tiltable support and a towing dolly having a turntable connection.

Still another object is to provide a towing dolly having a tiltable wheel support and a turnable under carriage cooperatively related for free turning movement relative to each other as well as tilting action of the wheel support relative to the draw bar of the dolly.

Yet another object is to provide a turnable wheel support and under carriage of simple construction which is inexpensive to manufacture, and highly efficient in use.

These and other objects of the present invention will become apparent from the following specification in the light of the drawings in which:

Fig. 1 is a side elevation of a towing dolly embodying the present invention.

Fig. 2 is a longitudinal section of the towing dolly of Fig. 1 at slightly larger scale.

Fig. 3 is an isometric view of the upper portion or wheel support of the towing dolly.

Fig. 4 is an isometric view of the lower portion or under carriage of the towing dolly.

Fig. 5 is a plan view of the towing dolly shown in Figs 1 and 2 at 180° with respect thereto, and with the under carriage and wheel support turned relative to each other.

Fig. 6 is a diagram illustrating the towing dolly of the present invention in use and being drawn around a curved path.

Referring now to Figs. 1 through 4 the towing dolly 10 generally comprises an under carriage 11 and wheel supporting frame 12.

The wheel supporting frame 12 comprises parallel channels 13 and 14 spaced from each other to receive and support respective side wheels of conventional vehicles. These channels 13—14 are disposed with their flanges adapted to extend upwardly to form side guides for preventing wheels on the web portion of the channels from rolling off of the same.

As shown in Fig. 3, both channels 13—14 are similar in form in that each has an upturned fore end 15 and a down turned aft end 16. The channels are sufficiently long to provide a ramp for one set of wheels of a vehicle to be towed, that is, only the front set or the rear set of wheels as the case may be.

The two channels 13—14 are secured in spaced relation by cross members 17 and 18, 17 preferably being an H shape and 18 a T shape of standard stock, cold rolled steel. The flat sides of the channel webs are secured to the respective cross members in any suitable manner, in the present disclosure by welding.

The mid-portions of the cross members are braced by parallel struts 19 and 20 of H shape, each having their ends cut to fit the shape of the cross member against which they abut. The struts 19—20 are spaced from each other and from the wheel supporting channels 13—14 in the manner shown in Figs. 3 and 5 and are welded to the respective cross members 17—18.

Turntable plates 21 and 22 extend between the upper and lower flanges, respectively, of the struts 19—20 and are welded to the same in the manner shown. These plates 21—22 are provided with aligned holes 23 and 24, respectively, to receive a pivot pin or bolt 25. The turntable plates are preferably disposed in an area somewhat forwardly of the lateral center line of the frame 12 for reasons later to be made apparent.

The under carriage 11, as best illustrated in Fig. 4, comprises an axle 30 of square stock steel having its ends machined to receive dolly wheels 31 and 32 and threaded to fit hub nuts, not shown, for securing the wheels 31—32 to the axle. A tongue or shaft 35 is secured to the foregoing axle and wheel assembly and has a conventional trailer hitch 36 on its fore end adapted for connection to the ball head of a bolt 37 carried by a towing vehicle or tractor T in the manner as shown in Fig. 1.

The tongue 35 comprises a straight shaft 40, having its aft end pivotally connected as at 41, to a pair of angle irons 42 and 43, the vertical flanges of which embrace the shaft 40. The pivotal connection 41 comprises a pair of aligned holes in the fore region of the vertical flanges of angle irons 42—43, a similar hole in the aft region of shaft 40, and a pin or bolt 45 adapted to extend through the same.

In the foregoing manner, the shaft and angle irons are hinged for vertical swinging movement relative to each other. However, this movement is limited by a stop plate 46 welded to the upper surfaces of horizontal flanges on angle irons 42—43 so that when the latter and the shaft 40 become aligned by a downward thrust, further swing of the two in that direction is halted. The angle irons and shaft are adapted to be locked in aligned relation by a peg bolt 47 when the latter is inserted through registering holes in the angle irons and shaft. This peg bolt may be secured by a chain to the tongue 35 for placement and/or withdrawal as desired.

Just rearwardly of the pivotal connection 41 between the shaft 40 and angle irons 42—43 the latter are blocked apart by an L-shaped spacer 48. A similar spacer 49 is provided a slight distance rearwardly of the spacer block 48 and a roll 50 is pivotally supported between them. This roll 50 is substantially co-axial with the shaft 40 and is so disposed that its periphery extends slightly above the upper surfaces of the horizontal flanges of angle irons 42—43.

The two angle irons 42—43 are bent to diverge from the aft spacer block 49 at an angle calculated to cause their spread ends 51 to abut the axle 30 just inwardly of the dolly wheels. The end 51 of each angle iron has its upper and lower flanges cut away and its web bent to lie parallel to the axle 30 for connection to the same by bolts 52 or in any other suitable manner.

It will be noted in Fig. 4 that the axle 30 is provided with a hole 53 comparable to and adapted for alignment with the holes 23—24 provided in the turntable plates 21—22. The pivot pin or bolt 25, Fig. 2, extends through the aligned holes 23—24 and 53 and has a nut 54 on its threaded end for securing the wheel supporting frame 12 to the under carriage 11.

With the frame 12 and under carriage united in the foregoing manner, the H-shaped member 17 rests upon the roll 50. Consequently, the under carriage is free to turn relative to the wheel supporting frame, even though the latter is carrying a load. The frame 12 and under carriage are secured together in a manner to permit the foregoing turning movement and to maintain the frame in substantial parallelism with the diverging angle portion 42—43 of the tongue.

The means for securing the frame and under carriage in the foregoing manner comprises a U bolt 59 having a roll 60 pivotally mounted on its bight portion. The roll 60 is adapted to overlie the top flange of the H member 17, the legs of the U bolt extending through holes provided in the spacer blocks 48 and 49 and bolted to the latter as shown in Fig. 2.

If desired, the H member may be further supported by auxiliary rolls 61 and 62 suitably mounted in the same plane as the roll 50 between angle brackets 63 secured to the respective angle irons 42 and 43.

In operation the towing dolly is coupled to the towing vehicle in the manner as shown in Fig. 1. The peg bolt 47 is withdrawn so that the tongue 35 pivots at 41 to allow the wheel supporting frame 12 and under carriage to tilt into inclined position with the downturned aft end 16 of the channels 13 and 14 touching the pavement.

The vehicle V to be towed can now be driven under its own power or pulled by a winch W so that either its front or rear wheels climb the inclined channels 13—14. As soon as the wheels of vehicle V pass over the axis of the dolly wheels 31—32, the wheel supporting frame 12 and under carriage will tilt back into parallelism with the shaft 40 of the tongue 35. The stop plate 46 cooperates with pivotal connection 41 in limiting the shaft and under carriage against further movement under the load borne by the wheel supporting frame. The peg bolt 47 is now replaced in the aligned holes in the angle irons 42—43 and shaft 40 to prevent accidental tilting of the frame 12 out of alignment with shaft 40.

It will be noted in Fig. 2 that the wheels of vehicle V are slightly ahead of the dolly wheels 31—32. This position must be maintained during towing of vehicle V and therefore its wheels are blocked by wedges 65 suitably locked upon the respective channels 13—14 by a pin 66 inserted through the flanges of the channels and the wedges.

Any forward motion of the wheels of vehicle V is stopped by the upturned fore ends of the channels 13—14.

It should be noted in Fig. 1 that the dolly wheels 31—32 are substantially smaller in diameter than conventional vehicle wheels. Consequently, the frame 12, when in inclined position to receive the lead wheels of a vehicle to be towed, will not be struck by the bumper of that vehicle. Moreover, the swing of the frame 12 from inclined to horizontal position is relatively short by reason of the substantially small diameter of the dolly wheels. Since the dolly wheels are disposed within the frame 12 the diameter of the dolly wheels is further important with respect to the turning of the undercarriage relative to the frame 12. In this connection it will be noted in Fig. 5 that the dolly wheels are free to turn within the spaces between the channels 13—14 and the struts 19—20.

From the foregoing it will be apparent that a vehicle in tow has its two trailing wheels upon the pavement and that only the fore end of the vehicle is supported upon the dolly 10. In making a turn, see Fig. 6, no excessive strain or torque is put upon either the towed vehicle, the dolly or the tractor T. While the maximum turning angle obtainable between the under-carriage 11 and the wheel supporting frame 12 is liberal, stops 67 and 68, Fig. 5, may be provided to prevent any undue unbalanced relation between them. However, if desired, the auxiliary rolls 61 and 62 may be employed to lend sufficient lateral support to the frame 12 to assure against accidental tipping thereof.

While I have described the preferred form of the present invention in detail, it will be apparent that the same may be modified, altered or varied without departure from the spirit of the invention. I therefore desire to avail myself of all modifications, alternations and variations coming within the purview of the appended claims.

What I claim as new and desire to protect by Letters Patent is:

1. In a towing dolly including a frame for supporting the two lead wheels of a conventional automotive vehicle to be towed, a two wheeled undercarriage having a forwardly extending tongue adapted to be hitched to a tractor, and a hinge connection on said tongue permitting tilting of said undercarriage and frame into a rearward inclined position for receiving the lead wheels of the vehicle to be towed and limiting tilting of said frame and undercarriage against tilting forwardly beyond alignment with said tongue; the combination therewith of a turntable connection between said frame and undercarriage comprising a plate on said frame adapted to bear against said undercarriage, a vertically disposed pin extending through said plate and undercarriage, and a roll at the fore end of said undercarriage for supporting the fore end of said frame for swinging movement about said vertically disposed pin.

2. In a towing dolly of the type having a two wheeled undercarriage with a forwardly extending tongue and a load bearing frame for receiving and supporting the lead wheels of a conventional automotive vehicle to be towed, the combination therewith of means for pivotally connecting said frame and undercarriage for turning movement in parallel planes about an axis perpendicular thereto, said tongue comprising spaced members and a straight shaft having its aft end pivotally connected between said spaced members, a stop plate secured to the upper surfaces of said spaced members forwardly of said point of pivotal connection thereof with said shaft for limiting swinging movement of the two in one direction only, and a roll supported in substantial axial alignment with said shaft and having its periphery extending above the upper surfaces of said spaced members for supporting the fore end of said frame for turning movement relative to said undercarriage.

3. A device for towing a conventional automobile comprising a two wheeled dolly having an axle forming an undercarriage, a tongue extending forwardly from said axle for hitching said dolly to a tractor, a hinge on said tongue substantially midway its ends for effecting tilting of said undercarriage rearwardly, means on said tongue cooperating with said hinge for limiting tilting of said undercarriage in the opposite direction beyond axial alignment with said tongue, a frame including fore and aft cross members joined by medial struts having a turntable plate between them, a pin securing said turntable plate to the axle of said undercarriage whereby the wheels of said dolly are straddled by said fore and aft cross members of said frame, said fore and aft cross members having their ends extending beyond the plane of rotation of the wheels of said dolly, and a wheel track secured to the extended ends of said fore and aft cross members in spaced relation to said dolly wheels for receiving the lead wheels of an automobile to be towed when said undercarriage frame and spaced tracks is tilted rearwardly, said dolly wheels being turnable about said pin and between said struts and said tracks when said undercarriage is in alignment with said tongue.

4. A device for towing a conventional automobile comprising a two wheeled dolly having an axle forming an undercarriage, a tongue extending forwardly from said axle for hitching said dolly to a tractor, a hinge on said tongue substantially midway its ends for effecting tilting of said undercarriage rearwardly, means on said tongue cooperating with said hinge for limiting tilting of said undercarriage in the opposite direction beyond axial alignment with said tongue, a frame including fore and aft cross members joined by medial struts having a turntable plate between them, a pin securing said turntable plate to the axle of said undercarriage whereby the wheels of said dolly are straddled by said fore and aft cross members of said frame, said fore and aft cross members having their ends extending beyond the plane of rotation of the wheels of said dolly, and a wheel track secured to the extended ends of said fore and aft cross members in spaced relation to said dolly wheels for receiving the lead wheels of an automobile to be towed when said undercarriage frame and spaced tracks is tilted rearwardly, said dolly wheels being turnable about said pin and between said struts and said tracks when said undercarriage is in alignment with said tongue, and a roller journalled for free rotation on said tongue and about an axis parallel to said tongue and disposed to receive said fore cross member of said frame to support the latter during turning movement of said undercarriage relative to said frame.

JACK C. HALE.

REFERENCES CITED

The following references are of record in the file of this patent:

UNITED STATES PATENTS

| Number | Name | Date |
|---|---|---|
| 1,316,660 | Winn | Sept. 23, 1919 |
| 1,332,388 | Egan | Mar. 2, 1920 |
| 1,374,224 | Patterson | Apr. 12, 1921 |
| 1,435,065 | Holmes | Nov. 7, 1922 |
| 1,941,400 | Johnson | Dec. 26, 1933 |
| 2,254,532 | Knox | Sept. 2, 1941 |
| 2,408,862 | Lisota | Oct. 8, 1946 |

FOREIGN PATENTS

| Number | Country | Date |
|---|---|---|
| 440,233 | Great Britain | Dec. 23, 1935 |
| 661,305 | France | Mar. 4, 1929 |
| 726,877 | France | June 4, 1932 |
| 661,995 | Germany | July 1, 1938 |